United States Patent [19]
Willis et al.

[11] Patent Number: 5,582,127
[45] Date of Patent: Dec. 10, 1996

[54] RESCUE DEVICE AND METHOD

[75] Inventors: Lee Willis, 11593 Larchmont Dr., Corona, Calif. 91720; Scott Ganaja, Redondo Beach, Calif.

[73] Assignee: Lee Willis, Corona, Calif.

[21] Appl. No.: 224,260

[22] Filed: Apr. 7, 1994

[51] Int. Cl.$^6$ .................................................. B64B 1/40
[52] U.S. Cl. ................. 116/210; 116/DIG.8; 116/DIG.9
[58] Field of Search ............................ 116/210, DIG.9, 116/DIG.8; 244/31, 33, 98; 40/214; 446/220, 221, 222, 223, 224, 225, 226; 441/9, 30, 93, 94; 222/5

[56] References Cited

U.S. PATENT DOCUMENTS

| | | |
|---|---|---|
| 3,746,285 | 7/1973 | Mango . |
| 3,941,079 | 3/1976 | McNeill . |
| 4,042,882 | 8/1977 | Camacho et al. ...................... 116/210 |
| 4,295,438 | 10/1981 | Porter . |
| 4,416,433 | 11/1983 | Bellina . |
| 4,551,106 | 11/1985 | Prager ....................................... 441/94 |
| 4,560,356 | 12/1985 | Burr ............................................. 222/5 |
| 4,586,456 | 5/1986 | Forward .................................. 116/210 |
| 4,696,252 | 9/1987 | Grill . |
| 4,787,575 | 11/1988 | Stewart .................................... 116/210 |
| 4,800,835 | 1/1989 | Mears ....................................... 116/210 |
| 4,815,677 | 3/1989 | Rushing . |
| 4,903,958 | 2/1990 | DiCarlo et al. .......................... 116/210 |
| 4,911,379 | 3/1990 | Kopelman ................................ 116/210 |
| 4,917,041 | 4/1990 | Weiswurm et al. ..................... 116/210 |
| 4,917,646 | 4/1990 | Kieves . |
| 4,944,242 | 7/1990 | Russell . |

Primary Examiner—William A. Cuchlinski, Jr.
Assistant Examiner—Andrew Hirshfeld
Attorney, Agent, or Firm—John J. Connors; Connors & Associates

[57] ABSTRACT

Disclosed is a method and device 10 for marking an individual's location to facilitate rescue. The method comprises the step of removing a cover member or cap 24 of the device 10 which contains an inflatable balloon 40 to open a valve 28 of a cylinder 18 containing a pressurized, lighter than air gas which inflates a balloon 40, so that the balloon rises in the atmosphere. The balloon 40 is tied to one end of a line 48 that has another end attached to the device 10. Thus, the balloon 40 travels upward a distance essentially equal to the length of the line 48, hovering overhead to identify the individual's location.

8 Claims, 3 Drawing Sheets

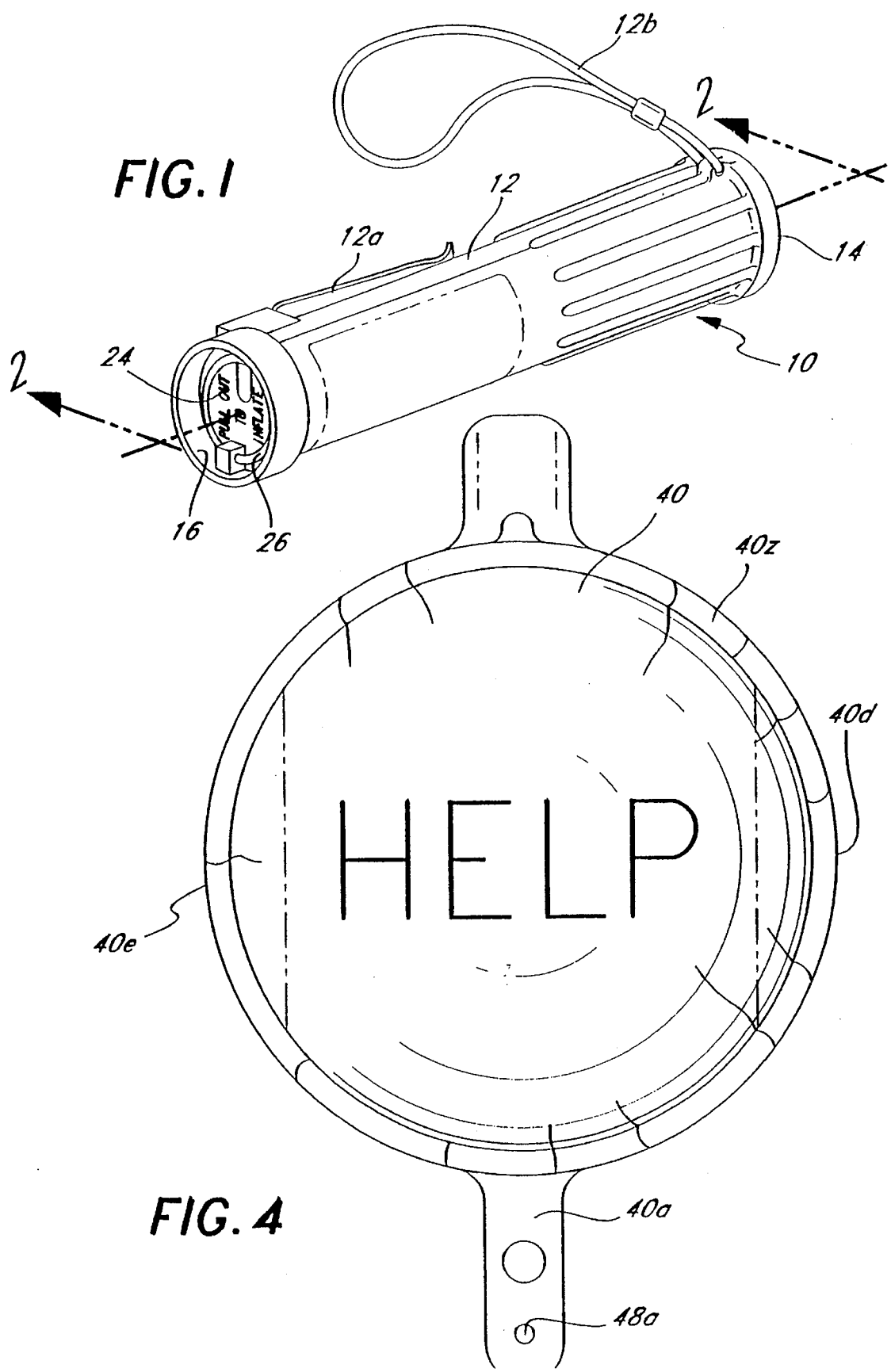

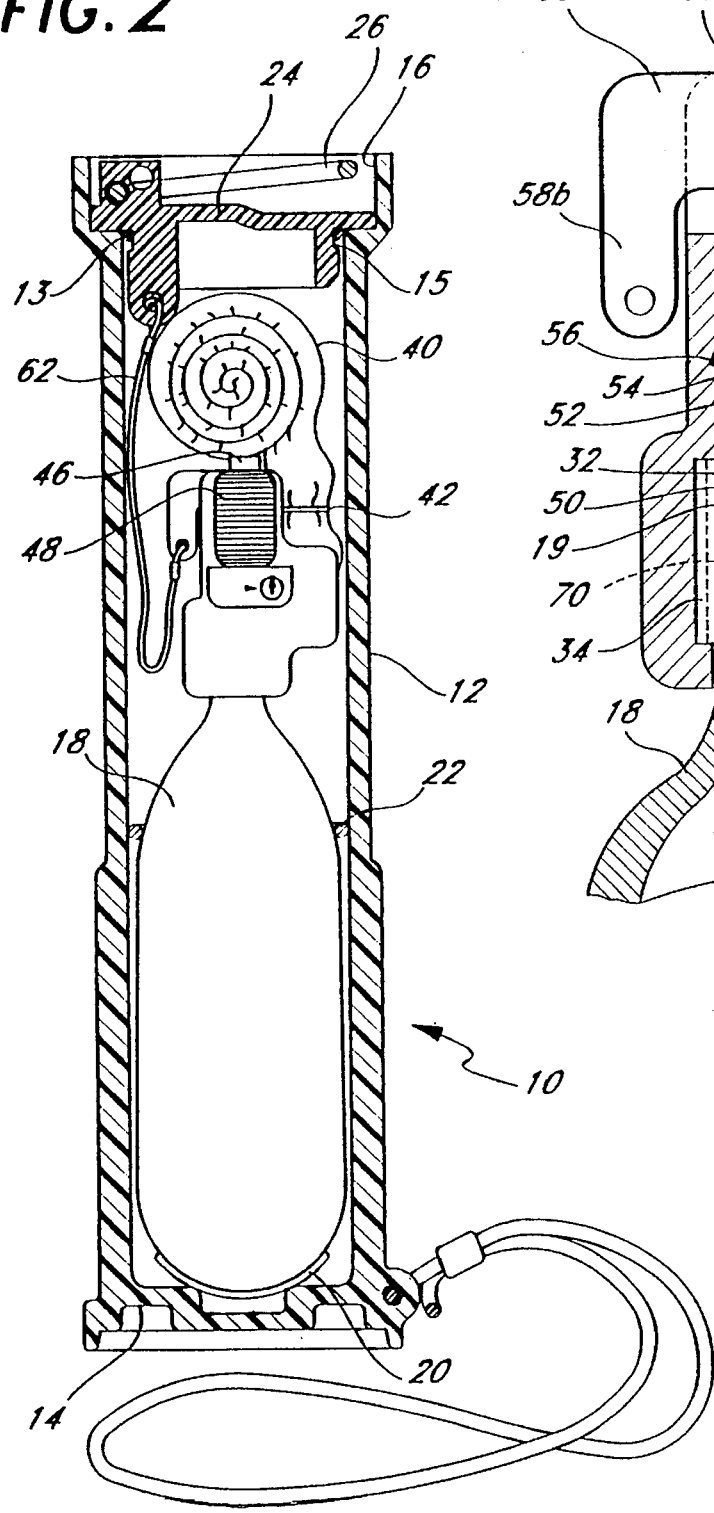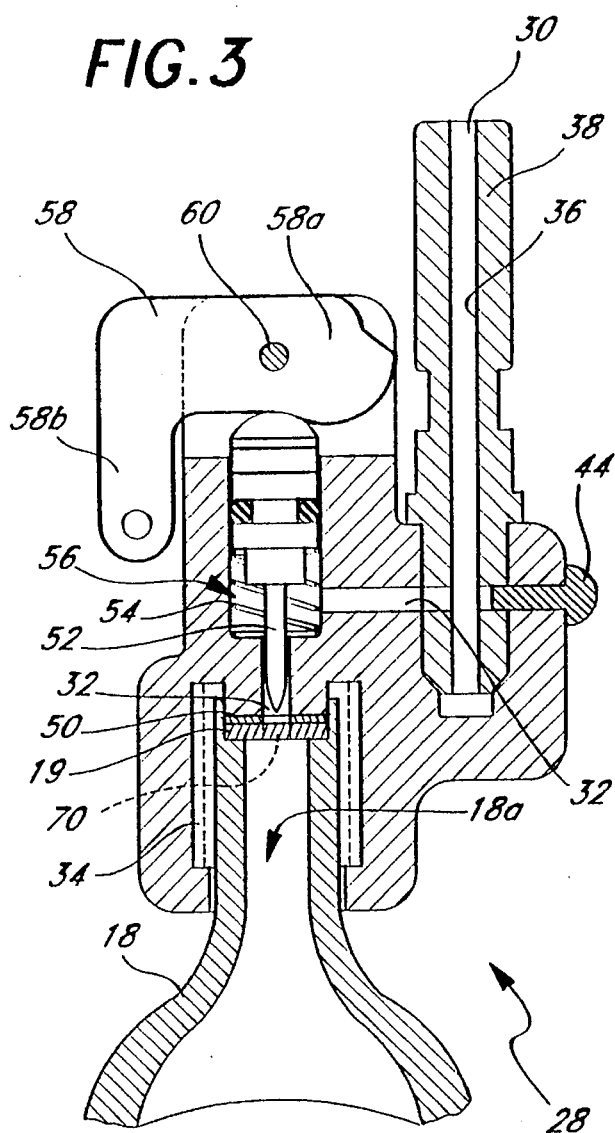

RESCUE DEVICE AND METHOD

BACKGROUND OF THE INVENTION

1. Field of the Invention

This invention relates to a rescue device and, in particular, one which uses a balloon to identify the location of a lost or injured person, or anyone who needs assistance.

2. Background Discussion

Frequently campers, boaters, hikers, mountain climbers and other people who are in wilderness areas or at sea are lost or injured, or otherwise need assistance. It would be very useful, indeed vital, for these individuals to have a device that would identify their location so that they could be rescued. Ideally, the device would be compact, lightweight, and easy to carry and use. It may, however, be relatively large for certain applications. It is the objective of this invention to provide such a device.

SUMMARY OF THE INVENTION

The device and method of this invention have several features, no single one of which is solely responsible for its desirable attributes. Without limiting the scope of this invention as expressed by the claims which follow, its more prominent features will now be discussed briefly. After considering this discussion, and particularly after reading the section entitled, "DETAILED DESCRIPTION OF THE PREFERRED EMBODIMENT," one will understand how the features of this invention provide its advantages, which include compactness and lightness, safety and simplicity of use.

The first feature of the rescue device of this invention is that it marks a lost or injured individual's location by releasing a balloon so that someone far from this location is able to observe the balloon floating above the individual's location. The balloon is initially a deflated balloon.

The second feature is a pressurized, lighter than air gas in a container is used to inflated the balloon. An inflator valve connected between an outlet in the container and a self-sealing inflation port in the balloon controls inflation of the balloon. Upon opening the valve, the balloon is inflated.

The third feature is the design of the inflator valve. It has a valve body with a passageway placing the outlet in the container in communication with the inflation port of the balloon. A pierceable member in the passageway prevents gas from flowing into the balloon until it is punctured by a nearby piercing element. A valve actuator actuates the piercing element upon removal of the cover member to puncture the pierceable member. This permits the gas in the container to flow through the passageway into the inflation port of the balloon to inflate the balloon.

The fourth feature is that the valve body includes a stem member into which the passageway extends. The stem member extends into the inflation port of the balloon. There is a releasable clamping member holding the balloon to the stem until gas is forced under pressure through the inflation port of the balloon into the balloon to fill the balloon and release the clamping member.

The fifth feature is a housing which encloses the container, the inflator valve, and the deflated balloon. There is a removable cover member closing off an open end in the housing, and the valve actuator is connected to the cover member. The cover member has a pull ring to remove the cover member from the housing and a pull cord that connects the cover member to valve actuator. Upon removal of the cover member from the container, the valve actuator is actuated to open the inflator valve to inflate the balloon.

The sixth feature is a line, having one end attached to the device and another end attached to the balloon, which keeps the balloon attached to the device. Preferably, a rotatable member has the line wound about it, with the line having one end attached to the rotatable member and another end attached to the balloon. The length of line is typically 50 to 100 feet, so that the balloon stays just over the location, but high in the air so that it may be observed from afar. The weight of the device is sufficient so that the balloon only rises a distance essentially equal to the length of the line.

The seventh feature is that the balloon, while deflated, is rolled up in a predetermined manner that allows said balloon upon being inflated to exit the open end of the housing solely under the pressure of the gas that inflates the balloon upon removal of the cover member.

The method for marking an individual's location to facilitate rescue comprises the step of removing a cover member of a device containing an inflatable balloon to open a valve of a container of a pressurized, lighter than air gas which inflates a balloon that rises in the atmosphere. The balloon is tied to one end of a line that has another end attached to the device, thereby allowing the balloon to travel upward a distance essentially equal to the length of the line, and identify the individual's location.

DESCRIPTION OF THE DRAWING

The preferred embodiment of this invention, illustrating all its features, will now be discussed in detail. This embodiment depicts the novel and non-obvious method and device of this invention shown in the accompanying drawing, which is for illustrative purposes only. This drawing includes the following figures (FIGS.), with like numerals indicating like parts:

FIG. 1 is a perspective view of the rescue device of this invention.

FIG. 2 is a cross-sectional view of the rescue device of this invention.

FIG. 3 is an enlarged cross-sectional view of the inflator valve assembly used in the device of this invention.

FIG. 4 is an inflated balloon used in the rescue device of this invention.

DESCRIPTION OF THE PREFERRED EMBODIMENT

Figure 5:
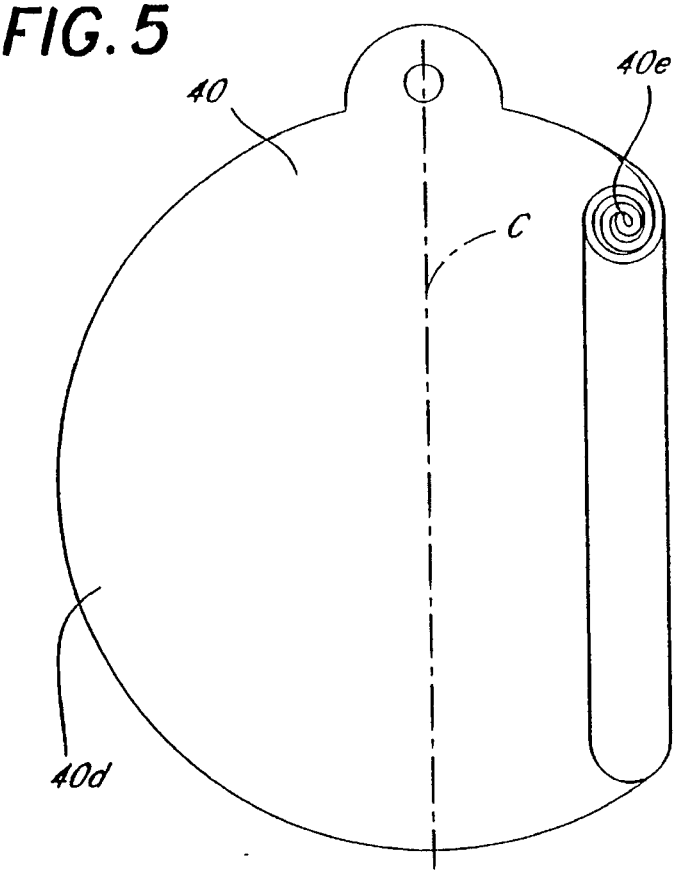
FIGS. 5 and 6 are plan views of the balloon partially rolled up.

As best illustrated in FIGS. 1–3, the rescue device 10 of this invention includes a housing 12 having a closed bottom end 14 and an open top end 16. Preferably, the housing 12 has on its side a belt clip 12a that allows the user to clip the device 10 to his or her belt, and a wrist strap 12b for facilitating carrying the device. Contained within the housing 12 is a cylinder 18 of pressurized, lighter-than air gas such as helium. There is a pad 20 disposed between the bottom of the cylinder 18 and the closed bottom end 14 of the housing 12 on which the end of the cylinder 18 rests and a retainer ring 22 force fitted between the wall of the housing 12 and an intermediate section of the cylinder 18. The one end of the cylinder has a seal 19, which, when pierced, allows gas to escape from the cylinder 18. A cover or cap 24 closes off the open top end 16 of the housing 12, and an "O" ring seal 13 in a groove 15 provides a water seal. A pull ring 26 is attached to the exterior of the cap, allowing the user to pull the cap from the open top end of the housing 12.

As depicted in detail in FIG. 3, an inflator valve 28 is connected to an outlet 18a of the cylinder 18. It includes a valve body 30 having an opening 34 which is in communication with the outlet 18a and an opening 36 that receives a stem 38. There is a passageway 32 extending between the openings 34 and 36. The inlet end 40a is connected to the stem 38.

As shown in FIG. 2, a balloon 40 with a self sealing inlet end 40a is used. A suitable balloon 40 may be purchased from Anagram, Inc., and is described in U.S. Pat. No. 4,917,646. The balloon 40 has a self-sealing inlet end 40a (FIG. 4). The inlet end 40a of the balloon 40 is retained on the stem 38 by a clamping member or retainer ring 42, and the stem is held in position in the valve body 30 by a set screw 44. Mounted on the valve body 30 is a spool 46 (FIG. 2) which has wound about it a fish line 48. One end (not shown) of the fish line is attached to the spool 46 and the other end 48a of the line 48 is attached to the balloon 40 at the inlet end 40a as shown in FIG. 4.

Figure 7:
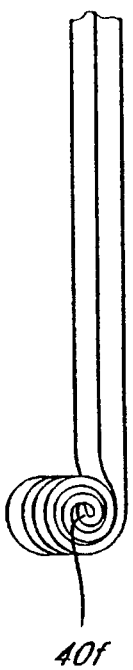
FIG. 7 is a perspective view of the balloon partially rolled up.
Figure 6:
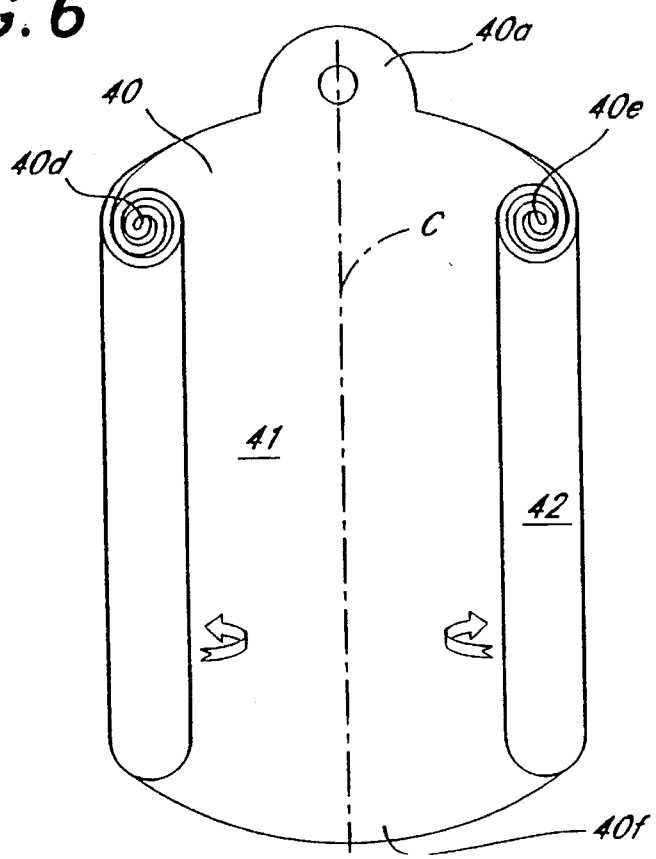
Figure 8:
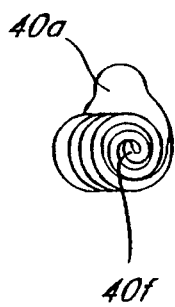
FIG. 8 is a perspective view of the balloon completely rolled up.

The balloon 40, while deflated, is folded and rolled up as illustrated in FIGS. 5 through 8, so that it fits within the housing 12. Specifically, the deflated balloon 40 is generally flat, and upon being inflated has a circular outline and an oval cross-section. The balloon includes opposed faces 41, 42, lateral sides 40d, 40e, and opposed ends 40a, 40f. When deflated, each lateral side 40d and 40e of the balloon is rolled inward towards the center line C on the face 41. Next, the lower end 40f of the balloon, with the sides rolled up to the center line C, is rolled towards the self sealing inlet end 40a. This manner of rolling the balloon 40 insues that it will open when inflated and be release solely under the influence of the pressurized gas filling the balloon. The balloon 40, as illustrated in FIG. 4, preferably has a section such as its outer edge 40z, covered with a thin, foil-like, metal film which is light and RADAR reflective. Thus, in the day light, the section 40z will reflect light like a mirror. At night, radar can be used to detect the balloon 40. The balloon 40 may also have the words "HELP" printed on one side and international distress symbol "S.O.S" printed (not shown) on the other side.

As depicted in FIG. 3, in the passageway 32 between the openings 34 and 36, is a thin annular gasket 50. A plunger pin 52 is received in a bore 54 in the valve body 30 and is spring biased by a compression spring 56 that normally urges the plunger pin outward from the bore. A valve actuator includes an L-shaped lever 58 attached to the valve body 30 by a pivot rod 60. This lever 58 has one arm 58a resting on top of the head of the plunger pin 52. There is one end of a pull cord 62 attached to the cap 24 and another end attached to the other arm 58b of the lever 58. Upon removing the cap 24, the pull cord 62 yanks the arm 58b of the lever 58 causing it to rotate in a clockwise direction as shown in FIG. 3. The arm 58a of the lever 58 pivots about the rod 60, forcing the plunger pin 52 downward against the action of the spring 56 to pierce the seal 19.

To use the rescue device 10 of this invention, the injured or lost person simply grasps the pull ring 26 and pulls the cap 24 from the open end 16 of the housing 12. Simultaneously, the L-shaped lever 58 pivots to depress the plunger pin 52, so that the tip of the plunger pin 52 punctures the seal 19. Thus, with one single action of the user, the device 10 is actuated. Upon release of the cap 24, the puncture pin 52 is returned by the action of the spring 56 to the position shown in FIG. 3. This creates an opening 70 in the seal 19, allowing the pressurized lighter-than-air gas to flow through the passageway 32 into the self-sealing inlet end 40a of the balloon 40, inflating the balloon 40 as depicted in FIG. 4. As the balloon 40 is inflated, it is forced out of the housing 12 through the uncovered, open end 16 and rises in the atmosphere, with the gas being retained in the balloon due to the self sealing feature at the inlet end 40a. As the gas fills the balloon 40, the internal pressure causes the self sealing inlet 40a to seal. The pressure inside the cylinder 18 ranges between 2000 and 3000 psig. This is sufficient to insure that the balloon 40 is inflated to maximum capacity under a wide and varying range of temperature and pressure encounter at different altitudes and in different environments. The line 48 maintains attached to both the balloon 40 and the device 10. The device 10 has sufficient weight so that the balloon 40 does not lift the device 10 into the atmosphere. Thus, the location of the individual is identified by the balloon 40 hovering overhead.

SCOPE OF THE INVENTION

The above presents a description of the best mode contemplated of carrying out the present invention, and of the manner and process of making and using it, in such full, clear, concise, and exact terms as to enable any person skilled in the art to which it pertains to make and use this invention. This invention is, however, susceptible to modifications and alternate constructions from that discussed above which are fully equivalent. Consequently, it is not the intention to limit this invention to the particular embodiment disclosed. On the contrary, the intention is to cover all modifications and alternate constructions coming within the spirit and scope of the invention as generally expressed by the following claims, which particularly point out and distinctly claim the subject matter of the invention:

What is claimed is:

1. A rescue device that marks an individual's location, comprising:

a deflated balloon having a self-sealing inflation port, said balloon having a center line, opposed faces, opposed lateral sides, and opposed ends and being generally flat when deflated, with the inflation port being nearby one of said ends of the balloon, said center line connecting said opposed ends;

each of said lateral sides being rolled inward against one of said faces and towards the center line so that said balloon is a partially rolled balloon, which is then rolled inward from the end opposed to the inflation port, towards the inflation port, so that said balloon is a completely rolled balloon;

an inflator valve in communication with the inflation port of the completely rolled balloon;

a container which holds a pressurized, lighter than air gas, said container having an outlet port in communication with the inflator valve, said inflator valve upon being opened causing the lighter than air gas to enter the completely rolled balloon to inflate the balloon;

a housing which encloses the container, the inflator valve, and the completely rolled balloon, said housing having an open end covered by a removable cover member;

a secured line of predetermined length for securing the balloon upon inflation to the device, said line having one end attached to the balloon; and a valve actuator connected to the cover member so that, upon removal of the cover member from the housing, the valve actuator opens the inflator valve causing the lighter than air gas to enter the completely rolled balloon to inflate the balloon, which exits the housing solely under the pressure of the lighter than air gas.

2. The rescue device of claim 1 where the inflator valve includes a valve body having a passageway placing the outlet port of the container in communication with the inflation port of the balloon;

a pierceable member sealing the outlet port of the container; and a piercing element near the pierceable member;

said valve actuator engaging the piercing element upon removal of the cover member to force the piercing element to puncture the pierceable member, so that the gas in the container flows through the passageway into the inflation port of the balloon to inflate the balloon.

3. The rescue device of claim 2 where the valve body includes a stem member into which the passageway extends, said stem member extending into the inflation port of the balloon, and a releasable clamping member holding the balloon to the stem member until gas is forced under pressure through the inflation port of the balloon into the balloon to fill the balloon and release the clamping member, so that the balloon rises in the atmosphere, with the line preventing separation of the balloon, the weight of the device being sufficient so that the balloon rises to a maximum distance essentially equal to the length of the line.

4. The rescue device of claim 1 where the cover member has a pull ring to remove the cover member from the housing and a pull cord that connects the cover member to the valve actuator.

5. The rescue device of claim 1 including a wrist strap attached to the housing.

6. The rescue device of claim 1 where the line has a length of from about 50 feet to about 500 feet.

7. A rescue device that marks an individual's location, comprising:

a deflated balloon having a self-sealing inflation port, said balloon having a center line, opposed faces, opposed lateral sides, and opposed ends and being generally flat when deflated, with the inflation port being nearby one of said ends of the balloon, said center line connecting said opposed ends;

each of said lateral sides being rolled inward against one of said faces and towards the center line so that said balloon is a partially rolled balloon, which is then rolled inward from the end opposed to the inflation port, towards the inflation port, so that said balloon is a completely rolled balloon;

an inflator valve in communication with the inflation port of the completely rolled balloon;

a rotatable member attached to the inflator valve, said rotatable member having a line of predetermined length wound thereon, said line having one end attached to the balloon and a different end attached to the rotatable member;

a container which holds a pressurized, lighter than air gas, said container having an outlet port in communication with the inflator valve, said inflator valve having a valve body including:

a stem member extending into the inflation port of the balloon, and a releasable clamping member holding the balloon to the stem member;

a housing enclosing the container, the inflator valve, the rotatable member, and the completely rolled balloon, said housing including a removable cover member;

said inflator valve further including:

a piercable member sealing the container;

a piercing element near the piercable member; and a valve actuator connected to the cover member by a pull cord so that, upon removal of the cover member from the housing, the pull cord moves the valve actuator into the piercing element, which forces the piercing element to puncture the piercable member, so that the lighter than air gas flows through the stem member and into the inflation port of the completely rolled balloon to inflate the balloon and release the clamping member from the balloon, said balloon exiting the housing solely under the pressure of the lighter than air gas, with the line keeping the balloon attached to the rotatable member, the weight of the device being sufficient so that the balloon only rises a distance essentially equal to the length of the line, said cover member having a pull ring for removing the cover member from the housing.

8. A method for marking an individual's location to facilitate rescue, comprising the steps of:

providing a deflated, generally flat balloon having a self sealing inflation port nearby a first end of the balloon, said balloon having a center line, opposed faces, opposed lateral sides, and a second end opposed to said first end, said center line connecting said first end and said second end;

rolling each of said lateral sides inward against one of said faces and towards the center so that said balloon is a partially rolled balloon;

rolling the second end of the partially rolled balloon towards the first end so that said balloon is a completely rolled balloon;

attaching said inflation port to a valve of a container, the container having therein a pressurized, lighter than air gas;

attaching a line to said completely rolled balloon and also to said device;

enclosing said completely rolled balloon and said container within a housing, said housing having a removable cover attached thereto, said removable cover being connected to said valve of said container wherein removal of said cover results in opening of said valve; and removing said cover from said housing to open said valve of the container, said removing step causing inflation of said balloon and release of said balloon from the housing, the line preventing detachment of the balloon and the housing.

\* \* \* \* \*